United States Patent
Mastrolia et al.

(10) Patent No.: US 11,970,274 B2
(45) Date of Patent: Apr. 30, 2024

(54) PARACHUTE RISER CRADLE

(71) Applicant: AMI Industries, Inc., Colorado Springs, CO (US)

(72) Inventors: Bradley Mastrolia, Colorado Springs, CO (US); Ian Walter Haas, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 150 days.

(21) Appl. No.: 17/510,118

(22) Filed: Oct. 25, 2021

(65) Prior Publication Data
US 2023/0126329 A1 Apr. 27, 2023

(51) Int. Cl.
*B64D 17/24* (2006.01)
*B64D 17/34* (2006.01)
*B64D 17/78* (2006.01)
B64D 17/30 (2006.01)

(52) U.S. Cl.
CPC ............. *B64D 17/24* (2013.01); *B64D 17/34* (2013.01); *B64D 17/78* (2013.01); B64D 17/30 (2013.01)

(58) Field of Classification Search
CPC ........ B64D 17/24; B64D 17/30; B64D 17/78; B64D 17/34
See application file for complete search history.

(56) References Cited

U.S. PATENT DOCUMENTS

| | | | |
|---|---|---|---|
| 1,857,375 A * | 5/1932 | Hoffman | B64D 17/30 244/151 R |
| 3,841,590 A | 10/1974 | Valentine | |
| 5,904,324 A | 5/1999 | Di Bella | |
| 10,946,970 B2 | 3/2021 | Volny et al. | |
| 11,021,256 B2 | 6/2021 | Volny et al. | |
| 11,027,851 B2 | 6/2021 | Volny et al. | |
| 2015/0069186 A1 | 3/2015 | Blignaut et al. | |
| 2017/0106987 A1* | 4/2017 | Adams | B64D 17/30 |
| 2020/0094972 A1* | 3/2020 | Volny | B64D 17/62 |
| 2020/0094974 A1* | 3/2020 | Volny | B64D 25/02 |
| 2020/0094975 A1* | 3/2020 | Volny | B64D 25/10 |

FOREIGN PATENT DOCUMENTS

| | | |
|---|---|---|
| DE | 4039516 | 6/1991 |
| EP | 3156332 | 4/2017 |
| FR | 2608392 | 6/1988 |
| FR | 2772717 | 6/1999 |

OTHER PUBLICATIONS

European Patent Office, European Search Report dated Mar. 13, 2023 in Application No. 22203594.1.

* cited by examiner

*Primary Examiner* — Justin M Benedik
(74) *Attorney, Agent, or Firm* — SNELL & WILMER L.L.P.

(57) ABSTRACT

A suspension line assembly for a parachute assembly, comprising a plurality of suspension lines bound together at a confluence, a first riser extending between the confluence and a first attachment location disposed on a first strap, a second riser extending between the confluence and a second attachment location disposed on a second strap and a cradle disposed between the first riser and the second riser.

11 Claims, 6 Drawing Sheets

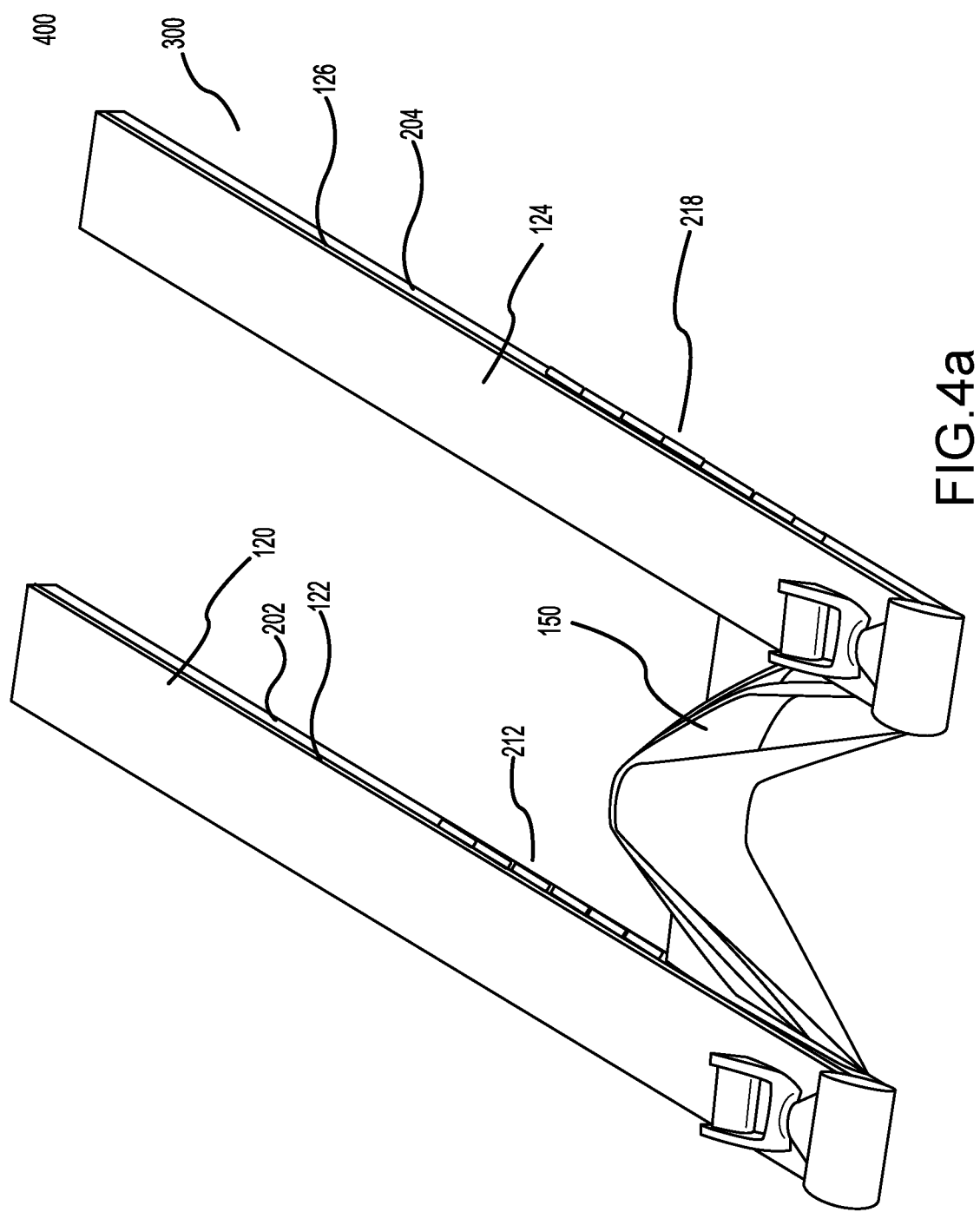

PARACHUTE RISER CRADLE

FIELD

The present disclosure relates to parachutes, and more specifically, to parachutes and methods of making parachutes comprising a cradle to prevent injuries during deployment of the parachute.

BACKGROUND

Parachutes may be used to slow and stabilize an object (e.g., an ejection seat or a person) supported by the parachute. Parachutes typically comprise a canopy to increase drag, and suspension lines coupled to the canopy. The suspension lines may be weaved or otherwise bound to one another to form risers configured to attach the object to the parachute and stabilize the object to reduce rotation while under canopy.

SUMMARY

A suspension line assembly for a parachute is disclosed, comprising a plurality of suspension lines bound together at a confluence, a first riser extending between the confluence and a first attachment location disposed on a first strap, a second riser extending between the confluence and a second attachment location disposed on a second strap, and a cradle disposed between the first riser and the second riser.

In various embodiments, a first parallel riser is coupled in parallel with the first riser, and a second parallel riser is coupled in parallel with the second riser.

In various embodiments, a first tandem riser is coupled to the first parallel riser, and a second tandem riser is coupled to the second parallel riser.

In various embodiments, the cradle is coupled to the first tandem riser and the second tandem riser.

In various embodiments, a first set of horizontal straps is coupled to the first tandem riser and the first parallel riser, and a second set of horizontal straps is coupled to the second tandem riser and the second parallel riser.

In various embodiments, the first set of horizontal straps are between 0.5 inches to 8 inches (1.27 cm to 20.32 cm) apart from each other and the second set of horizontal straps are between 0.5 inches to 8 inches (1.27 cm to 20.32 cm) apart from each other.

In various embodiments, the first set of horizontal straps comprises a first navigational strap and the second set of horizontal straps comprises a second navigational strap, and the first navigational strap and the second navigational strap are configured to control steering of the parachute.

In various embodiments, wherein the cradle comprises at least one of canvas, nylon, polyester, cotton, reinforcement fibers such as aramid and para-aramid fiber, and combinations of the same.

A parachute assembly is disclosed, comprising a canopy and a suspension line assembly coupled to the canopy, the suspension line assembly comprising a plurality of suspension lines bound together at a confluence, a first riser coupled to the confluence, a first parallel riser coupled to the confluence in parallel with the first riser, a second riser coupled to the confluence, and a second parallel riser coupled to the confluence in parallel with the second riser.

In various embodiments, the suspension line assembly further comprises a first tandem riser coupled to the first parallel riser, and a second tandem riser coupled to the second parallel riser.

In various embodiments, the suspension line assembly further comprises a cradle coupled between the first tandem riser and the second tandem riser.

In various embodiments, the suspension line assembly further comprises a first set of horizontal straps coupled to the first tandem riser and the first parallel riser, and a second set of horizontal straps coupled to the second tandem riser and the second parallel riser.

In various embodiments, the first set of horizontal straps are between 0.5 inches to 8 inches (1.27 cm to 20.32 cm) apart from each other and the second set of horizontal straps are between 0.5 inches to 8 inches (1.27 cm to 20.32 cm) apart from each other.

In various embodiments, the first set of horizontal straps comprises a first navigational strap and the second set of horizontal straps comprises a second navigational strap.

In various embodiments, the first navigational strap and the second navigational strap are configured to control steering of the parachute assembly.

In various embodiments, the suspension line assembly is coupled to the canopy and a first attachment location disposed on a first strap.

In various embodiments, the cradle comprises at least one of canvas, nylon, polyester, cotton, reinforcement fibers such as aramid and para-aramid fiber, and combinations of the same.

A method of making a parachute is disclosed, comprising forming a first riser by binding a first plurality of suspension lines together, forming a second riser by binding a second plurality of suspension lines together, forming a first confluence using the first plurality of suspension lines, forming a second confluence using the second plurality of suspension lines, coupling a first parallel riser in parallel with the first riser between the first confluence and a first attachment location, coupling a second parallel riser in parallel with the second riser between the second confluence and a second attachment location of the second riser, coupling a first tandem riser to the first parallel riser, and a second tandem riser to the second parallel riser, and coupling a cradle between the first tandem riser and the second tandem riser, wherein the first riser, the first parallel riser, the first tandem riser, the second riser, the second parallel riser, the second tandem riser and the cradle are compressed together when the parachute is in a stowed position, and wherein the first riser, the first parallel riser, the first tandem riser, the second riser, the second parallel riser, the second tandem riser and the cradle are decompressed in response to a deployed position of the parachute.

In various embodiments, the method further comprises coupling a canopy to the first plurality of suspension lines and the second plurality of suspension lines.

In various embodiments, the method further comprises coupling a first set of horizontal straps between the first parallel riser and the first tandem riser, and coupling a second set of horizontal straps between the second parallel riser and the second tandem riser.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIG. 4a illustrates a perspective view of the suspension line assembly configured in a stowed position, in accordance with various embodiments;

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Disclosed herein is a parachute assembly including, in various embodiments, a suspension line assembly having risers and a cradle disposed between the risers. When a parachute assembly is deployed there is a large amount of force put on the parachute assembly which is then transferred to the parachute operator. The cradle may be configured to dampen the forces applied to the parachute operator's neck and head during deployment of the parachute assembly.

Figure 1:
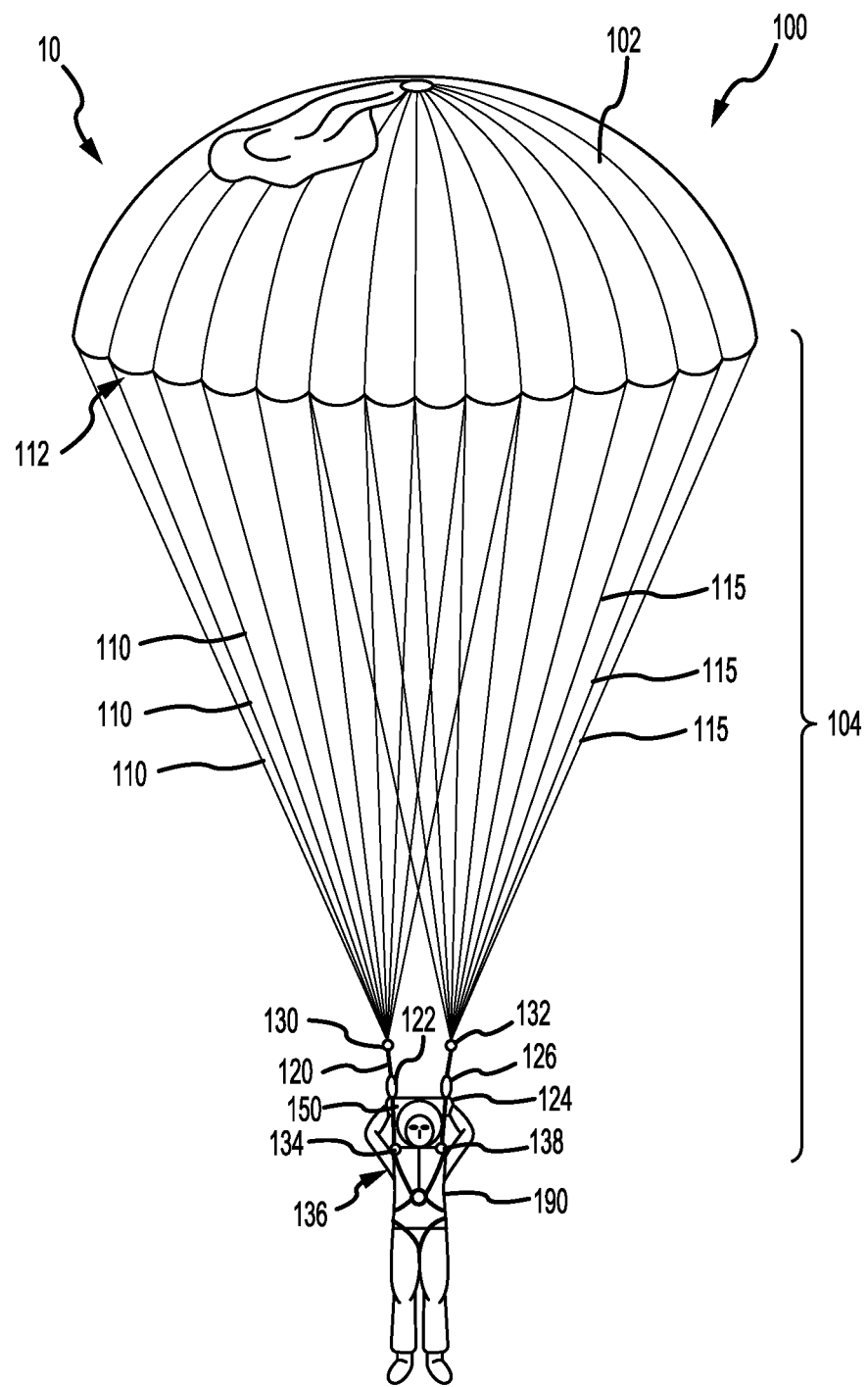
FIG. 1 illustrates a perspective view of a parachute assembly having risers in a deployed position, in accordance with various embodiments.

With reference to FIG. 1, a parachute assembly 100 is illustrated in a deployed position 10, in accordance with various embodiments. Parachute assembly 100 may comprise a canopy 102 and a suspension line assembly 104. Suspension line assembly 104 may comprise a first plurality of suspension lines 110, a first confluence 130 which splits into a first riser 120 and a first parallel riser 122, and a second plurality of suspension lines 115, a second confluence 132 which splits into a second riser 124 and a second parallel riser 126. In various embodiments, suspension lines 110 and suspension lines 115 may be attached to canopy 102 at a first end 112 of suspension line assembly 104.

The first riser 120, the first parallel riser 122, the second riser 124, and the second parallel riser 126 may be configured to attach an object, such as an occupant harness 190, to parachute assembly 100. In various embodiments the occupant harness 190 comprises a first strap 140 and a second strap 142, with momentary reference to FIG. 1. In various embodiments, first riser 120, and first parallel riser 122, may comprise a first attachment location 134. In various embodiments, second riser 124, and second parallel riser 126, may comprise a second attachment location 138. First attachment location 134 and second attachment location 138 may be proximate a second end 136 of suspension line assembly 104. First attachment location 134 and second attachment location 138 may comprise any suitable attachment mechanism for securing an object to parachute assembly 100. In various embodiments, first attachment location 134 and second attachment location 138 may comprise a loop created by each riser being bound to itself. In various embodiments, attachment locations 134 and 138 may comprise a shackle. In various embodiments, a cradle 150 is disposed between the first riser 120, and the second riser 124.

Figure 2:
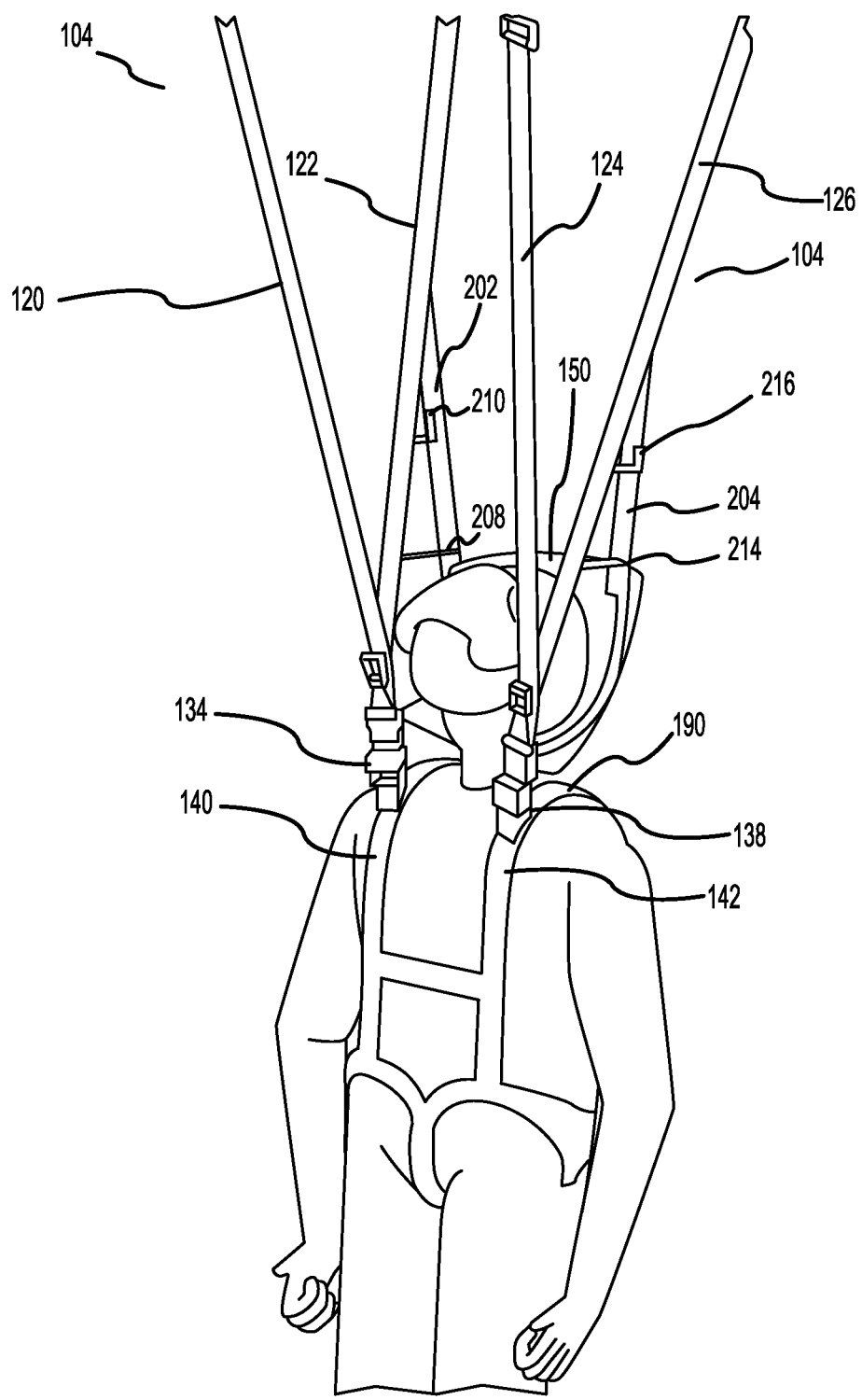
FIG. 2 illustrates a perspective view of a suspension line assembly, in accordance with various embodiments.

With additional reference to FIG. 2, a first tandem riser 202 may be coupled to the first parallel riser 122. In various embodiments, the first tandem riser 202 may be coupled to the first parallel riser 122 by reinforced stitching, adhesives, or fabric bonding. In various embodiments, a second tandem riser 204 may be coupled to the second parallel riser 126. In various embodiments, the second tandem riser 204 may be coupled to the second parallel riser 126 by reinforced stitching, adhesives, or fabric bonding.

In various embodiments the cradle 150 is disposed between the first riser 120 and the second riser 124. In various embodiments the cradle 150 is coupled to the first tandem riser 202 and the second tandem riser 204. The cradle 150 may comprise typical fabric materials like canvas, nylon, polyester, cotton, reinforcement fibers such as aramid and para-aramid fiber, and combinations of the same. The cradle 150 may be a rectangular shape such that it can wrap around a portion of the parachute operator. In various embodiments, the cradle 150 may be any suitable geometric shape. The cradle 150 may further be constructed with multiple panels, with or without gussets, to form a three-dimensional curve or other shape. The cradle 150 may be comprised of other suitable geometric shapes such as a square, a trapezoid or a circle. The cradle 150 may also be elastic and comprised of netting, webbing or the like. The cradle 150 may be attached to the first tandem riser 202 and the second tandem riser 204 such that there is space between the first parallel riser 122 and the first tandem riser 202, and there is space between the second parallel riser 126 and the second tandem riser 204. The space between the parallel risers and the tandem risers creates a window of visibility for the parachute operator which may be useful in an emergency situation.

In various embodiments the first riser 120, the first parallel riser 122, the second riser 124, and the second parallel riser 126 may be configured to attach an object, such as the occupant harness 190, to parachute assembly 100. The occupant harness may comprise a first strap 140 which attaches to the first attachment location 134. In various embodiments the occupant harness may comprise a second strap 142 which attaches to the second attachment location 138.

In various embodiments, there is at least one first horizontal strap 208 coupled to the first parallel riser 122 and the first tandem riser 202. In various embodiments, there may be a first set of horizontal straps comprised of more than one first horizontal strap 208. In various embodiments, the first set of horizontal straps may also comprise a first navigational strap 210 coupled to the first parallel riser 122 and the first tandem riser 202. Navigational straps may be used by the parachute operator to steer the parachute assembly once it's in the deployed position 10. In various embodiments there is at least one second horizontal strap 214 coupled to the second parallel riser 126 and the second tandem riser 204. In various embodiments there may be a second set of horizontal straps comprised of more than one first horizontal strap 214. The second set of horizontal straps may also comprise a second navigational strap 216 coupled to the second parallel riser 126 and the second tandem riser 204.

In various embodiments, the first navigational strap 210 and the second navigational strap 216 are configured to control steering of the parachute assembly. In various embodiments, the parachute operator may control the parachute assembly by placing a force on one or both of the first navigational strap 210 and the second navigational strap 212. Placing force on the navigational strap will create more drag in the canopy on the side the force is placed, which in allows the parachute operator to have navigational control of the parachute assembly. The horizontal straps also create a system that prevents the parachute operator from potentially getting an operator's head and/or neck stuck between a tandem riser and a parallel riser, which can cause injury.

Figure 3:
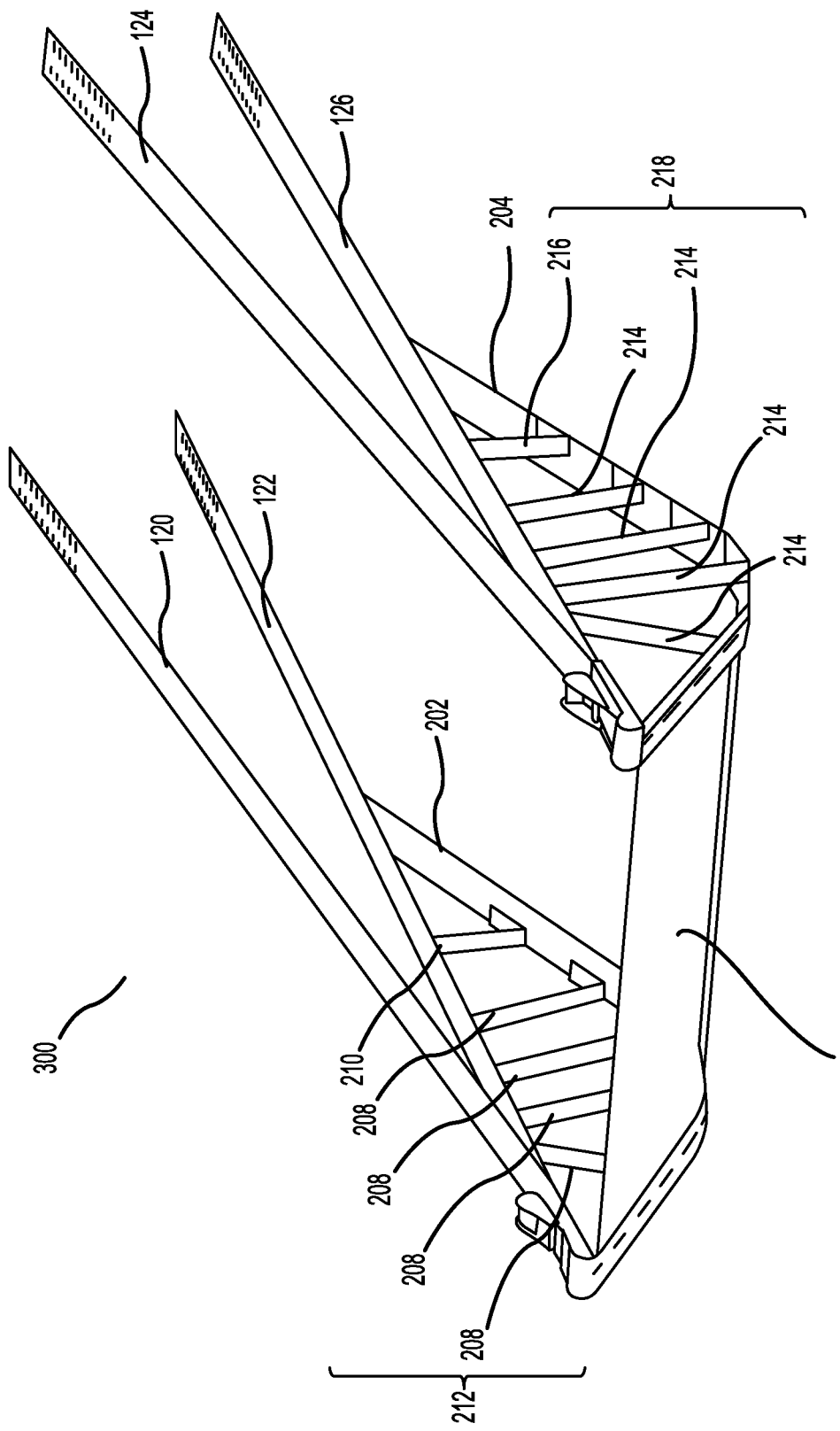
FIG. 3 illustrates a perspective view of the suspension line assembly, in accordance with various embodiments.

With combined reference to FIGS. 1, 2, and 3, a suspension line assembly 300 comprises at least one first horizontal strap 208 coupled to the first parallel riser 122 and the first tandem riser 202. In various embodiments there may be a first set of horizontal straps 212 comprised of more than one first horizontal strap 208 and at least one first navigational strap 210. Each first horizontal strap 208 may be between 0.5 inches to 8 inches (1.27 cm to 20.32 cm) apart from each other, between 1 inch to 6 inches (2.54 cm to 15.24 cm) apart from each other, and between 2 inches to 4 inches (5.08 cm 10.16 cm) apart from each other. In various embodiments, the first set of horizontal straps 212 may comprise four first horizontal straps 208.

In various embodiments, suspension line assembly 300 comprises at least one second horizontal strap 214 coupled to the second parallel riser 126 and the second tandem riser 204. In various embodiments, there may be a second set of horizontal straps 218 comprised of more than one second horizontal strap 214 and at least one second navigational strap 216. Each second horizontal strap 214 may be between 0.5 inches to 8 inches (1.27 cm to 20.32 cm) apart from each other, between 1 inch to 6 inches (2.54 cm to 15.24 cm) apart from each other, and between 2 inches to 4 inches (5.08 cm 10.16 cm) apart from each other. In various embodiments the second set of horizontal straps 218 may comprise four second horizontal straps 214. Suspension line assembly 300 also comprises a cradle 150 which is coupled to the first tandem riser 202 and the second tandem riser 204.

Figure 4B:
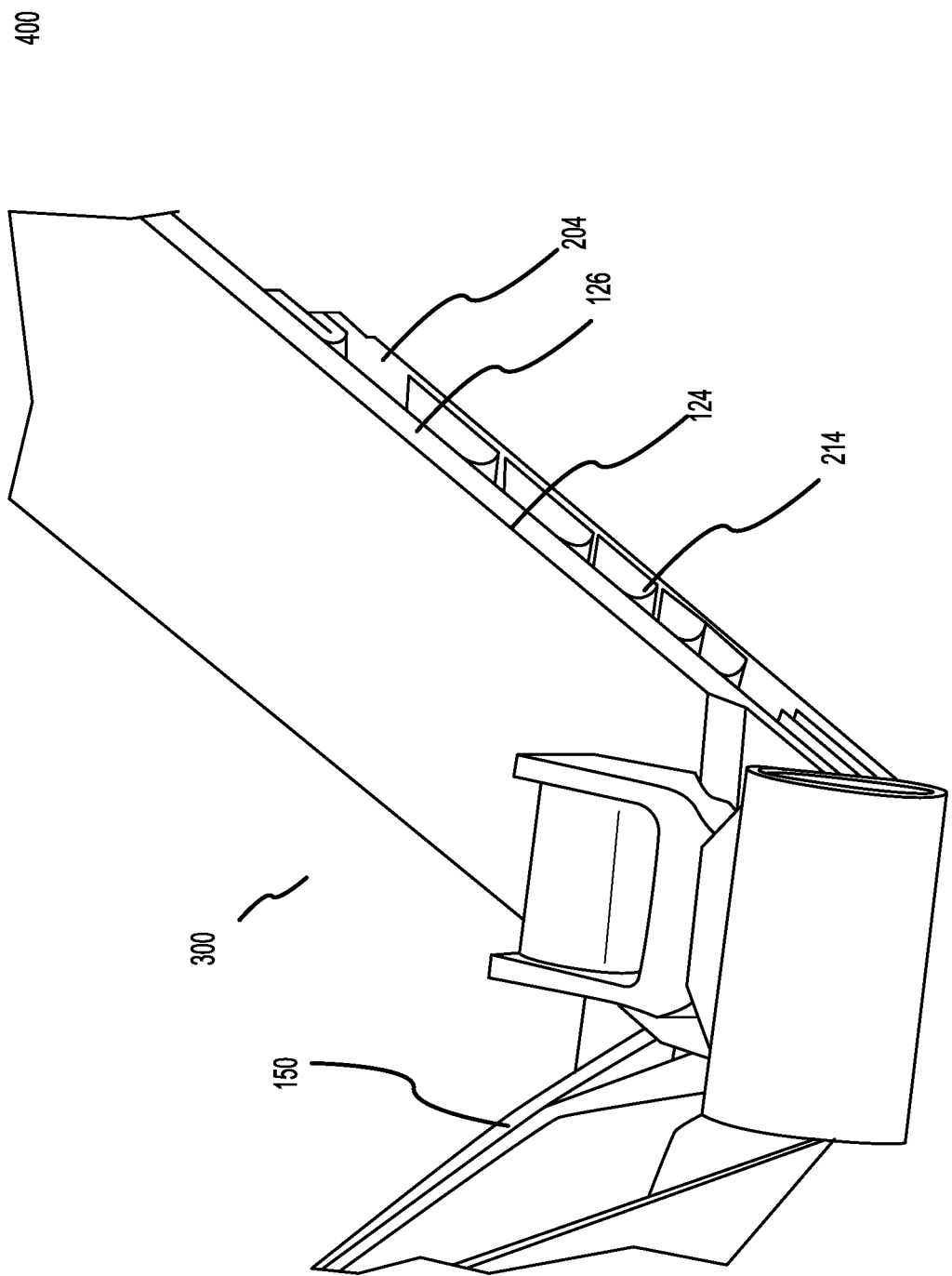
FIG. 4b illustrates a perspective view of the suspension line assembly configured in the stowed position, in accordance with various embodiments.
Figure 5:
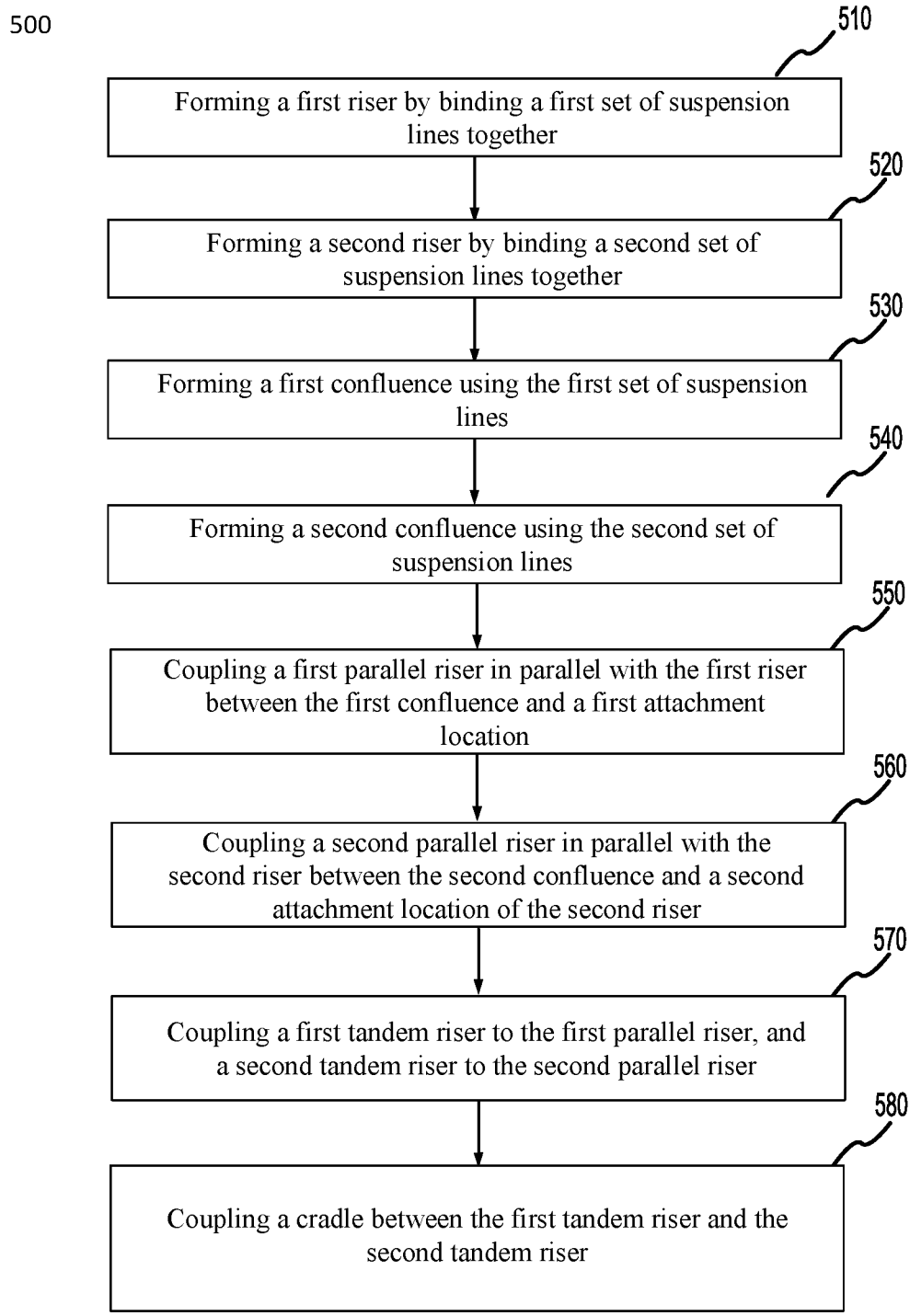
FIG. 5 illustrates a method for making a parachute with various embodiments.

With combined reference to FIG. 3, FIG. 4a and FIG. 4b, the suspension line assembly 300 may be disposed in a stowed position 400. In the stowed position 400 the first riser 120, the first parallel riser 122, the first tandem riser 202, and the first set of horizontal straps 212, are compressed together via a non-permanent bonding means such as tacking. In the stowed position 400 the second riser 124, the second parallel riser 126, the second tandem riser 204, and the second set of horizontal straps 218, are compressed together via a non-permanent bonding means such as tacking. In various embodiments the straps may be compressed together by other suitable non-permanent bonding means such that when the parachute assembly deploys then the straps may decompress and separate from each other such as in FIG. 3.

In various embodiments, the cradle 150 is coupled to the first tandem riser 202 and the second tandem riser 204 by stitching, though coupling may also be achieved through use of adhesives, fabric bonding, rivets, other fasteners, and combinations of the same. In various embodiments, the cradle 150 is compressed and its material is folded together in the stowed position 400. In various embodiments, the cradle 150 material may be folded together in the manner of bellows to make the cradle 150 compact while in the stowed position 400. In various embodiments, the cradle 150 may also be folded in the shape of a v while in the stowed position 400. Folding and compressing the cradle 150 while in the stowed position 400 allows for easier storage of the cradle 150 while the parachute is not deployed.

With additional reference to FIG. 1, FIG. 4a, FIG. 4b, and FIG. 5, a method 500 for forming the parachute assembly 100 is provided, in accordance with various embodiments. Method 500 includes, forming the first riser 120 by binding the first plurality of suspension lines 110 together (step 510). Method 500 includes forming the second riser 124 by binding the second plurality of suspension lines 115 together (step 520). Method 500 includes forming the first confluence 130 using the first plurality of suspension lines 110 (step 530). Method 500 includes forming the second confluence 132 using the second plurality of suspension lines 115 (step 540). Method 500 includes coupling the first parallel riser 122 in parallel with the first riser 120 between the first confluence 130 and the first attachment location 134 (step 550). Method 500 includes coupling a second parallel riser 126 in parallel with the second riser 124 between the second confluence 132 and a second attachment location 138 (step 560). Method 500 includes coupling a first tandem riser 202 to the first parallel riser 122, and a second tandem riser 204 to the second parallel riser 126 (step 570). Method 500 includes coupling the cradle 150 between the first tandem riser 202 and the second tandem riser 204 (step 580).

In various embodiments, the first riser 120, the first parallel riser 122, the first tandem riser 202, the second riser 124, the second parallel riser 126, the second tandem riser 204 and the cradle 150 are compressed together when the parachute is in the stowed position 400. In various embodiments, the first riser 120, the first parallel riser 122, the first tandem riser 202, the second riser 124, the second parallel riser 126, the second tandem riser 204 and the cradle 150 are decompressed in response to a deployed position 10 of the parachute assembly.

In various embodiments, method 500 may further comprise coupling the canopy 102 to the first plurality of suspension lines 110 and the second plurality of suspension lines 115. In various embodiments, method 500 may further comprise coupling the first plurality of horizontal straps 212 between the first parallel riser 122 and the first tandem riser 202 and coupling the second plurality of horizontal straps 218 between the second parallel riser 126 and the second tandem riser 204.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A suspension line assembly for a parachute assembly, comprising:
    a plurality of suspension lines bound together at a confluence;
    a first riser extending between the confluence and a first attachment location disposed on a first strap;
    a second riser extending between the confluence and a second attachment location disposed on a second strap;
    a cradle disposed between the first riser and the second riser;
    a first parallel riser coupled in parallel with the first riser;
    a second parallel riser coupled in parallel with the second riser;
    a first tandem riser coupled to the first parallel riser;
    a second tandem riser coupled to the second parallel riser, wherein the cradle is coupled to the first tandem riser and the second tandem riser;
    a first set of horizontal straps coupled to the first tandem riser and the first parallel riser; and
    a second set of horizontal straps coupled to the second tandem riser and the second parallel riser.

2. The suspension line assembly of claim 1, wherein the first set of horizontal straps are between 0.5 inches to 8 inches (1.27 cm to 20.32 cm) apart from each other and the second set of horizontal straps are between 0.5 inches to 8 inches (1.27 cm to 20.32 cm) apart from each other.

3. The suspension line assembly of claim 2, wherein the first set of horizontal straps comprises a first navigational strap and the second set of horizontal straps comprises a second navigational strap, and
    wherein the first navigational strap and the second navigational strap are configured to control steering of the parachute assembly.

4. The suspension line assembly of claim 3, wherein the cradle comprises at least one of canvas, nylon, polyester, cotton, aramid fiber and para-aramid fiber.

5. A parachute assembly, comprising:
    a canopy;
    a suspension line assembly coupled to the canopy, the suspension line assembly comprising:
        a plurality of suspension lines bound together at a confluence;
        a first riser coupled to the confluence;
        a first parallel riser coupled to the confluence in parallel with the first riser;
        a second riser coupled to the confluence;
        a second parallel riser coupled to the confluence in parallel with the second riser;
        a cradle disposed between the first riser and the second riser;
        a first tandem riser coupled to the first parallel riser;
        a second tandem riser coupled to the second parallel riser;
        a cradle coupled between the first tandem riser and the second tandem riser;
        a first set of horizontal straps coupled to the first tandem riser and the first parallel riser; and
        a second set of horizontal straps coupled to the second tandem riser and the second parallel riser.

6. The parachute assembly of claim 5, wherein the first set of horizontal straps are between 0.5 inches to 8 inches (1.27 cm to 20.32 cm) apart from each other and the second set of horizontal straps are between 0.5 inches to 8 inches (1.27 cm to 20.32 cm) apart from each other.

7. The parachute assembly of claim 6, wherein the first set of horizontal straps comprises a first navigational strap and the second set of horizontal straps comprises a second navigational strap.

8. The parachute assembly of claim 7, wherein the first navigational strap and the second navigational strap are configured to control steering of the parachute assembly.

9. The parachute assembly of claim 8, wherein the suspension line assembly is coupled to the canopy and a first attachment location disposed on a first strap.

10. The parachute assembly of claim 9, wherein the cradle comprises fabric.

11. A method of making a parachute assembly, comprising:
- forming a first riser by binding a first plurality of suspension lines together;
- forming a second riser by binding a second plurality of suspension lines together;
- forming a first confluence using the first plurality of suspension lines;
- forming a second confluence using the second plurality of suspension lines;
- coupling a first parallel riser in parallel with the first riser between the first confluence and a first attachment location;
- coupling a second parallel riser in parallel with the second riser between the second confluence and a second attachment location of the second riser;
- coupling a first tandem riser to the first parallel riser, and a second tandem riser to the second parallel riser;
- coupling a cradle between the first tandem riser and the second tandem riser, wherein the first riser, the first parallel riser, the first tandem riser, the second riser, the second parallel riser, the second tandem riser and the cradle are compressed together when the parachute is in a stowed position, wherein the first riser, the first parallel riser, the first tandem riser, the second riser, the second parallel riser, the second tandem riser and the cradle are decompressed in response to a deployed position of the parachute assembly;
- coupling a canopy to the first plurality of suspension lines and the second plurality of suspension lines;
- coupling a first plurality of horizontal straps between the first parallel riser and the first tandem riser; and
- coupling a second plurality of horizontal straps between the second parallel riser and the second tandem riser.

* * * * *